(12) United States Patent
Wang et al.

(10) Patent No.: US 12,316,579 B2
(45) Date of Patent: May 27, 2025

(54) METHOD AND APPARATUS FOR ENERGY SAVING IN A WIRELESS COMMUNICATION SYSTEM USING AN OPEN RADIO ACCESS NETWORK

(71) Applicant: Samsung Electronics Co., Ltd., Suwon-si (KR)

(72) Inventors: Yue Wang, Staines (GB); Junhyuk Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 17/837,611

(22) Filed: Jun. 10, 2022

(65) Prior Publication Data

US 2022/0407664 A1 Dec. 22, 2022

Related U.S. Application Data

(63) Continuation of application No. PCT/KR2022/008170, filed on Jun. 9, 2022.

(30) Foreign Application Priority Data

| Jun. 10, 2021 | (GB) | 2108333 |
| Jun. 15, 2021 | (GB) | 2108529 |
| May 20, 2022 | (GB) | 2207441 |

(51) Int. Cl.
*H04L 5/00* (2006.01)
*H04W 76/30* (2018.01)

(52) U.S. Cl.
CPC .......... *H04L 5/0098* (2013.01); *H04L 5/0048* (2013.01); *H04W 76/30* (2018.02)

(58) Field of Classification Search
CPC ... H04L 5/0098; H04L 5/0096; H04L 5/0091; H04L 5/0044; H04L 5/0053;
(Continued)

(56) References Cited

U.S. PATENT DOCUMENTS

| 8,515,410 B1 | 8/2013 | Bach |
| 2011/0170466 A1 | 7/2011 | Kwun |

(Continued)

FOREIGN PATENT DOCUMENTS

| CN | 111642011 A | | 9/2020 | |
| CN | 116057988 A | * | 5/2023 | ............ H04J 11/005 |

(Continued)

OTHER PUBLICATIONS

O-RAN; O-RAN Working Group 3 Near-Real-time RAN Intelligent Controller E2 Service Model (E2SM), RAN Control; ORAN.WG3. E2SM-RC-v01.01.03 Technical Specification; O-RAN Alliance; 2020.

(Continued)

*Primary Examiner* — Phong La
(74) *Attorney, Agent, or Firm* — Jefferson IP Law, LLP

(57) ABSTRACT

Disclosed is a method performed a network entity in a wireless communication system using an open-radio access network (O-RAN), the network entity including at least one of a non-real-time RAN intelligent controller (non-RT RIC) and near-RT RIC, the method comprises configuring at least one node with a list of cell IDs representing cells to be activated or deactivated based on a condition in a network, and transmitting, to the at least one node, information including the list of cell IDs.

15 Claims, 9 Drawing Sheets

(58) Field of Classification Search
CPC ... H04L 5/0058; H04L 5/0078; H04L 5/0042; H04L 5/0037; H04L 5/0033; H04L 5/003; H04W 76/30; H04W 76/29
See application file for complete search history.

(56) References Cited

U.S. PATENT DOCUMENTS

| | | |
|---|---|---|
| 2012/0165063 A1 | 6/2012 | Scalia et al. |
| 2013/0237266 A1 | 9/2013 | Futaki |
| 2013/0250908 A1 | 9/2013 | Bach et al. |
| 2015/0288809 A1 | 10/2015 | Liang et al. |
| 2019/0380037 A1 | 12/2019 | Lifshitz et al. |
| 2020/0106536 A1* | 4/2020 | Bedekar ............... H04W 48/20 |
| 2021/0051490 A1* | 2/2021 | Yanover ............... H04W 24/02 |
| 2021/0410107 A1* | 12/2021 | Park .................... H04W 76/27 |
| 2022/0014963 A1* | 1/2022 | Yeh ........................ G06N 7/01 |
| 2022/0225066 A1 | 7/2022 | Song et al. |
| 2022/0225369 A1* | 7/2022 | Park .................... H04W 72/23 |
| 2022/0240067 A1 | 7/2022 | Song et al. |
| 2022/0248296 A1* | 8/2022 | Merwaday ........... H04W 48/18 |
| 2022/0321295 A1* | 10/2022 | Marzban ............. H04L 27/2613 |
| 2022/0369351 A1* | 11/2022 | Sakhnini ................ H04L 5/001 |
| 2022/0407664 A1* | 12/2022 | Wang ................... H04L 5/0098 |
| 2023/0107244 A1* | 4/2023 | Peng .................... H04W 24/08 370/252 |
| 2023/0171592 A1* | 6/2023 | Han ....................... H04W 8/20 370/328 |
| 2023/0309079 A1* | 9/2023 | Xu .......................... H04W 8/24 |
| 2023/0370238 A1* | 11/2023 | Liu ..................... H04B 7/0639 |
| 2024/0129194 A1* | 4/2024 | Mueck .................. G06F 21/64 |

FOREIGN PATENT DOCUMENTS

| | | |
|---|---|---|
| EP | 2 568 753 A1 | 3/2013 |
| EP | 2 665 312 A1 | 11/2013 |
| EP | 3 013 090 A1 | 4/2016 |
| KR | 10-2021-0039311 A | 4/2021 |
| KR | 10-2021-0042040 A | 4/2021 |
| KR | 10-2021-0043474 A | 4/2021 |
| WO | 2012/116467 A1 | 9/2012 |
| WO | WO 2019029330 * | 2/2019 |
| WO | 2020/242987 A1 | 12/2020 |
| WO | 2021/071325 A1 | 4/2021 |
| WO | 2021/101315 A1 | 5/2021 |
| WO | 2022/092981 A1 | 5/2022 |

OTHER PUBLICATIONS

Telekom et al.; Open RAN Technical Priorities Executive Summary; Under the Open RAN Mou; May 2021.
O-RAN; O-RAN Architecture Description; O-RAN.WG1.O-RAN-Architecture-Description-v04.00 Technical Specification; O-RAN Alliance; 2021; Germany.
Zhang et al.; Artificial Intelligence based Architecture and Implementation of Wireless Network; 2021 2nd International Conference on Electronics, Communications and Information Technology (CECIT); IEEE; 2021.
International Search Report with Written Opinion dated Sep. 22, 2022; International Appln. No. PCT/KR2022/008170.
United Kingdom Combined Search and Examination Report dated Oct. 18, 2022; United Kingdom Appln. No. GB2207441.3.
United Kingdom Search Report dated Jun. 30, 2023; United Kingdom Appln. No. GB2207441.3.
Extended European Search Report dated Nov. 18, 2024; European Appln. No. 22820586.0-1206 / 4353024 PCT/KR2022008170.

* cited by examiner

| IE/Group Name | Presence | Range | IE type and reference | Semantic description | Criticality | Assigned Criticality |
|---|---|---|---|---|---|---|
| Message Type | M | | | | YES | reject |
| RIC Request ID | M | | | | YES | reject |
| RAN Function ID | M | | | | YES | reject |
| RIC Call Process ID | O | | | | YES | reject |
| RIC Control Header | M | | | | YES | reject |
| RIC Control Message | M | | | | YES | reject |
| RIC Control Ack Request | O | | | | YES | reject |

| IE/Group Name | Presence | Range | IE type and reference | Semantic description |
|---|---|---|---|---|
| RIC Control Header (601) | M | | OCTET STRING | Defined in RAN Function specific E2 Service Model |

| IE/Group Name | Presence | Range | IE type and reference | Semantic description |
|---|---|---|---|---|
| CHOICE Control Header Format | M | | | |
| > E2SM-RC Control Header Format 1 | | | | |
| > E2SM-RC Control Header Format 2 | | | | |

| IE/Group Name | Presence | Range | IE type and reference | Semantic description |
|---|---|---|---|---|
| UE ID | M | | | |
| RIC Style Type | M | | | |
| Control Action ID | M | | | |

| IE/Group Name | Presence | Range | IE type and reference | Semantic description |
|---|---|---|---|---|
| Cell ID | O | | Global Cell ID | |
| Slice ID | O | | S-NSSAI | |

FIG.6

METHOD AND APPARATUS FOR ENERGY SAVING IN A WIRELESS COMMUNICATION SYSTEM USING AN OPEN RADIO ACCESS NETWORK

CROSS-REFERENCE TO RELATED APPLICATION(S)

This application is a continuation application, claiming priority under § 365(c), of International application No. PCT/KR2022/008170, filed on Jun. 9, 2022, which is based on and claims the benefit of a Great Britain patent application number 2108333.2, filed on Jun. 10, 2021, in the Great Britain Intellectual Property Office, and of a Great Britain patent application number 2108529.5, filed on Jun. 15, 2021, in the Great Britain Intellectual Property Office, and of a Great Britain patent application number 2207441.3, filed on May 20, 2022, in the Great Britain Intellectual Property Office, the disclosure of each of which is incorporated by reference herein in its entirety.

FIELD

The present disclosure relates to improvements in the field of cell configurations in a telecommunication system. It finds particular, but not exclusive utility in the area of Open Radio Access Network, O-RAN, although it can find use in other areas as well. Embodiments of the present disclosure permit, in particular, improvements to be made in the area of energy efficiency.

BACKGROUND TO THE INVENTION 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

One underlying concept of Open Radio Access Network, O-RAN, is to enable more open and disaggregated radio access network architecture to improve network flexibility, and avoid vendor lock in. In order to encourage the development of a non-fragmented Open RAN system, the O-RAN alliance has developed the O-RAN architecture, that enables the building of virtualised RAN on open hardware and cloud, with embedded AI-powered radio control. Initiated by the O-RAN alliance, an open radio access network (O-RAN) established by operators and equipment providers in a system that combines the 4G communication system with the 5G system, defines a new network element, NE, and interface specifications based on the existing 3GPP standard, and presents the O-RAN structure.

SUMMARY

Embodiments of the present disclosure provides a method and apparatus for RAN energy saving in a wireless communication system using O-RAN.

According to the present disclosure there is provided an apparatus and method as set forth in the appended claims. Other features of the disclosure will be apparent from the dependent claims, and the description which follows.

Embodiments of the disclosure relate to apparatuses and methods, particularly but not exclusively, in an O-RAN architecture in a wireless communication system to enable RAN energy saving in O-RAN.

According to an aspect of embodiments, a method performed a network entity in a wireless communication system using an open-radio access network (O-RAN) is provided, the network entity including at least one of a non-real-time RAN intelligent controller (non-RT RIC) and near-RT RIC, the method comprises configuring at least one node with a list of cell IDs representing cells to be activated or deactivated based on a condition in a network, and transmitting, to the at least one node, information including the list of cell IDs.

According to an aspect of embodiments, a method performed by a radio access network (RAN) intelligent controller (RIC) in a wireless communication system using an open-radio access network (O-RAN) is provided, the method comprises transmitting a RIC control request message to an E2 node associated with a cell ID contained in a control header format, and receiving a RIC control confirmation message from the E2 node, wherein the RIC control request message includes at least one of information on a RAN function and information on a service model, and information on a RIC control result.

According to an aspect of embodiments, a method performed by an E2 node in a wireless communication system using an open-radio access network (O-RAN), the method comprises receiving a RIC control request message from a RAN control controller (RIC), and transmitting a RIC control confirmation message to the RIC, wherein the RIC control request message includes at least one of information on a RAN function and information on a service model, and information on a RIC control result.

According to an aspect of embodiments, a network entity in a wireless communication system using an open-radio access network (O-RAN) is provided, the network entity including at least one of a non-real-time RAN intelligent controller (non-RT RIC) and near-RT RIC, the network entity comprises a transceiver, and a processor configured to configure at least one node with a list of cell IDs representing cells to be activated or deactivated based on a condition in a network, and transmit, to the at least one node via the transceiver, information including the list of cell IDs.

According to a first aspect, there is provided a method of operating a telecommunication network, comprising one or more intelligent systems in the O-RAN architecture, comprising the step of: configuring at least one E2 node to active or inactive status, according to a condition of the network wherein the method is implemented by means of an xApp in a near-Real Time RAN Intelligent Controller, RIC; and/or an rAPP in a non-Real Time RIC. Such a condition may be an operational load of the at least one node in question.

In an embodiment, there is provided an E2 Application Protocol message. The E2 Application Protocol message is composed of a RIC Control Request Message format.

In an embodiment, there is a further step comprising the one or more intelligent systems providing the at least one E2 node with a list of cell IDs, to be activated or deactivated, respectively.

In an embodiment, there is a further step comprising the provision of a message protocol as exemplified in FIG. 5.

In an embodiment, there is a further step comprising reporting parameters to Near-RT RIC and non-RT RIC respectively, as a result of dynamic cell activation and deactivation.

According to a further aspect of the present disclosure, there is provided a "RAN Control" RAN Function to provide support of the CONTROL services on Cell Activation Control, which is used for modification of the configuration and to control cell activation/deactivation.

Further embodiments relate to: the Information Elements (IE) set out above; the procedures shown in FIG. 5; the rAPP and related interfaces (O1 and A1), procedures and parameters; and A1 policy, and related functions, procedures and parameters.

According to a further aspect of the present disclosure, there is provided a method performed by a radio access network (RAN) controlled controller (RIC) comprises the steps of: transmitting a RIC control request message to an E2 node; and receiving a RIC control confirmation message from the E2 node, wherein the RIC control request message includes information on a specific to RAN function specific to a service model, and the RIC control confirmation message for the function. The RIC control result information includes control result information, and the RIC control result information may include an event occurrence reason for the RAN function specific to the service model in a specific protocol.

According to embodiments of the present disclosure, a method performed by an E2 node comprises the steps of: receiving a RIC control request message from a radio access network (RAN) control controller (RIC); and transmitting a RIC control confirmation message to the RIC. The RIC control request message includes information on a specific to RAN function specific to a service model, and the RIC control confirmation message includes information on the RIC control function. The RIC control result information includes control result information, and the RIC control result information may include an event occurrence reason for the RAN function specific to the service model in a specific protocol.

The embodiments can be at least partially achieved by including a new xApp, namely energy saving xApp, in the near-RT RIC or a new rApp, energy saving rApp, in the Non-RT RIC. It can also be implemented by adding a specific service style, within an operator specific service model, i.e. cell activation and deactivation, in an E2 interface in which the RIC requests services to E2 nodes. In the case when it is implemented as a new service style, the present disclosure focuses on E2 CONTROL service. Specifically, embodiments of the disclosure are related to a new RAN configuration and procedure, i.e., cell activation and deactivation, to enable RAN power saving in O-RAN.

To ease the deployment of a fully disaggregated multi-vendor RAN, operators are setting out a list of essential requirements for implementation by suppliers. A gap analysis between the operator requirements and current standards has been performed to indicate areas where further standardization is required in order to accelerate the specification of non-mature defined open interfaces and functions, included in the Executive Summary of "OPEN RAN TECHNICAL PRIORITIES EXECUTIVE SUMMARY, by DT, Orange, Telefonica, TIM and Vodafone". It is noted that vendors should also implement features to reduce the energy consumption in both networks and devices in low load situations, with more automation introduced, in particular by RIC modules.

Increased network traffic demands have led to significant growth in energy consumption at the radio access networks, resulting in high network operation costs (OPEX). For example, energy consumption, which in turn increases the network OPEX, as 39% of the network OPEX can come from power consumption costs. It also brings environmental concerns, as information and communication technology (ICT) already accounts for 2.5% of the world's CO2 emissions, a figure that is expected to rise. To address this, new energy-saving solutions, that make future wireless networks more eco-friendly with reduced OPEX, are desired. As a result, network operators are investing in new energy-saving features to achieve energy optimization in their network.

Current network operations are tailored to cope with load at peak traffic periods, which accounts for approximately 28% of the network uptime, resulting in network resources being underutilized the rest of the time, wasting energy unnecessarily. It is possible to put cells into a sleeping/standby mode (i.e. deactivate the cells) at low traffic load, such that they consume less energy.

However, existing methods to deactivate the cells are based on a fixed threshold. Such a threshold is configured by operators in a static manner. For example, the static threshold for cell A to be off is 10%, which means when the load of cell A <10%, the system will handover a UE attached from cell A to cell B and turn off cell A. Such an energy saving method, based on static configurations in the network, is unable to meet such an objective for dynamically changing traffic. This is because network traffic can vary a lot, hour to hour, day to day, and location to location. The aforementioned static configurations in the network for cell activation/deactivation are therefore unable to meet the objective for dynamically changing traffic, as there is no 'one size fit for all' threshold for all situations.

Through the observation of cell loads (Physical Resource Block, PRB, usage), AI can be used to dynamically power down cells when the load is low, to save energy, and is shown to improve power saving at the radio access network, and can therefore be used by Mobile Operators to reduce the cost of electric bills, and lower the carbon footprint of their networks. It is however noted, that new apparatus and methods are needed, in order to enable such energy saving based on the O-RAN standard of a wireless communication system.

Embodiments of the present disclosure provide apparatus, methods, functions and interfaces based on an O-RAN architecture, to enable energy saving in the radio network for O-RAN. In the following, specific examples are presented in the context of energy saving but this is intended to be exemplary only. At a more general level, embodiments of the disclosure relate to intelligent configuration of cell activation/deactivation in ORAN.

Embodiments of the present disclosure relate to an apparatus and method for controlling an E2 node by an RIC in a radio access network for RAN energy saving. In particular, embodiments provide an apparatus and method for controlling an E2 node for RAN energy saving, through an E2 message, O1 message in accordance with an open radio access network (O-RAN) standard of a wireless communication system.

Embodiments of the disclosure provide an apparatus and method for transmitting a list of cell IDs that are to be activated and deactivated at the E2 nodes, for the purpose of energy saving of these E2 nodes. Embodiments also provide an apparatus and method for configuring an E2 node by the RIC according to the aforementioned cell ID list, so that the E2 node operates according to the control of the RIC. Embodiments further include an apparatus and method for returning the status of the E2 nodes, in terms of whether they are activated or deactivated, for subsequent operations from RIC to the E2 nodes, e.g., handover UEs. Embodiments also provide for configuring an E2 node by the Non-RT RIC through the O1 management interface.

In general terms, embodiments relate to the functionality and interfaces in O-RAN to address AI energy saving in accordance with an open radio access network (O-RAN) standard of a wireless communication system.

Although a few preferred embodiments of the present disclosure have been shown and described, it will be appreciated by those skilled in the art that various changes and modifications might be made without departing from the scope of the disclosure, as defined in the appended claims.

BRIEF DESCRIPTION OF THE DRAWINGS

For a better understanding of the disclosure, and to show how embodiments of the same may be carried into effect, reference will now be made, by way of example only, to the accompanying diagrammatic drawings in which:

FIG. 6 shows RIC Control Request Message format according to an embodiment of the disclosure;

DETAILED DESCRIPTION

Figure 1:
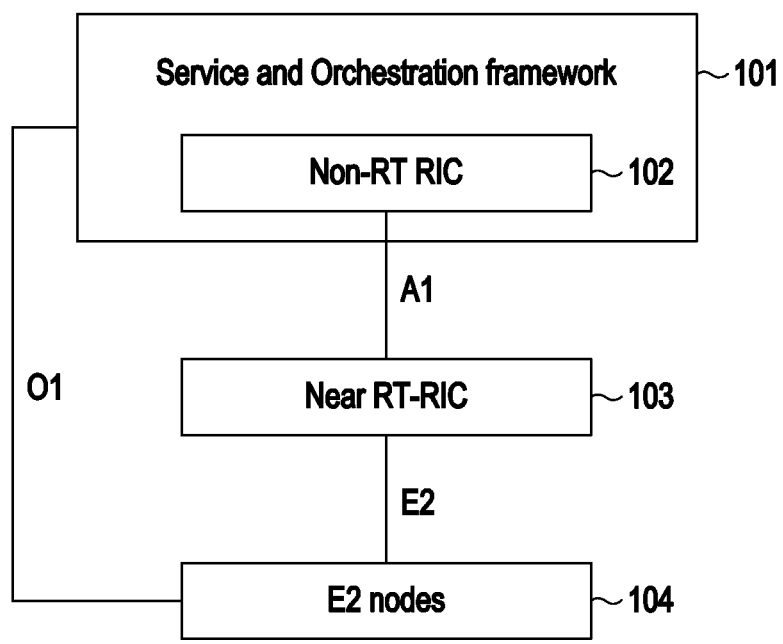
FIG. 1 shows a general architecture of an O-RAN system as known in the prior art.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is a subject that performs resource allocation to a user equipment (UE), and may be at least one of a gNode B, a gNB, an eNode B, an eNB, a Node B, a base station (BS), a radio access unit, a base station controller, or a node on a network. The base station may be an E2 node corresponding to a RAN in O-RAN system or a network entity, in an NR system, including at least one of an integrated access and backhaul (IAB)-donor that is a gNB which provides network access to a UE(s) via a network of backhaul and access links and an IAB-node that is a radio access network (RAN) node which supports NR access link(s) to a UE(s) and supports NR backhaul links to the IAB-donor or other IAB-nodes. A UE may be wirelessly connected via an IAB-node and may transmit or receive data to and from an IAB-donor connected to at least one IAB-node via a backhaul link.

A UE may include a terminal, a mobile station (MS), a cellular phone, a smartphone, a computer, or a multimedia system capable of performing communication functions. In the disclosure, a "downlink" refers to a radio link via which a base station transmits a signal to a UE, and an "uplink" refers to a radio link via which a UE transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Wireless communication systems have been developed from an initial wireless communication system providing a voice-oriented service to a broadband wireless communication system providing a high-speed and high-quality packet data service, such as those according to communication standards including a high-speed packet access (HSPA) of 3GPP, long-term evolution (LTE) (or evolved universal terrestrial radio access (E-UTRA)), LTE-advanced (LTE-A), LTE-Pro, high rate packet data (HRPD) of 3GPP2, ultra-mobile broadband (UMB), and 802.16e of IEEE.

In an LTE system, which is a representative example of the broadband wireless communication system, a downlink (DL) adopts an orthogonal frequency division multiplexing (OFDM) scheme and an uplink (UL) adopts a single carrier frequency division multiple access (SC-FDMA) scheme. The uplink refers to a radio link via which a UE transmits data or a control signal to a base station (BS) (or eNode B), and the downlink refers to a radio link via which a base station transmits data or a control signal to a UE. In such a multi-access scheme, normally data or control information of each user may be distinguished by assigning and operating time-frequency resources, at which the data or control information of each user is to be transmitted, so as not to overlap each other, that is, to establish orthogonality.

A 5G communication system, that is, a future communication system after LTE, should be able to freely reflect various requirements of users, service providers, etc., so that a service that concurrently satisfies various requirements should be supported. Services considered for the 5G communication system includes an enhanced mobile broadband (eMBB) communication, massive machine type communication (mMTC), ultra-reliability low latency communication (URLLC), and the like.

The eMBB aims to provide a data transmission rate that is more improved than a data transmission rate supported by existing LTE, LTE-A or LTE-Pro. For example, in the 5G communication system, an eMBB should be able to provide a maximum data rate (peak data rate) of 20 Gbps in a downlink and a peak data rate of 10 Gbps in an uplink from the perspective of one base station. The 5G communication system needs to provide a peak data rate while concurrently providing an increased actual user perceived data rate of a UE. In order to satisfy these requirements, improvement of various transmission or reception technologies including a more advanced multi-antenna (multi-input multi-output (MIMO)) transmission technology is required. A signal may be transmitted using a maximum transmission bandwidth of 20 MHz in a 2 GHz band used by LTE, whereas, in the 5G communication system, a data transmission rate, which is required by the 5G communication system, may be satisfied by using a frequency bandwidth wider than 20 MHz in a frequency band of 3 to 6 GHz or a frequency band of 6 GHz or higher.

Meantime, the mMTC is being considered to support application services, such as Internet of things (IoT), in the 5G communication system. In order to efficiently provide the IoT, the mMTC may require support of a large-scale UE access in a cell, coverage enhancement of a UE, an improved battery time, cost reduction of a UE, and the like. The IoT is attached to multiple sensors and various devices to support communication functions, so that the IoT should be able to support a large number of UEs (e.g., 1,000,000 UEs/km$^2$) within a cell. Due to the nature of a service, a UE that supports the mMTC is likely to be located in a shaded region, which cannot be covered by a cell, such as the basement of a building, and therefore a wider coverage may be required compared to other services provided by the 5G communication system. The UE that supports the mMTC may be required to be a low-cost UE, and since it is difficult to frequently replace a battery of the UE, a very long battery lifetime, such as 10 to 15 years, may be required.

Finally, the URLLC corresponds to a cellular-based wireless communication service used for a specific purpose (mission-critical). For example, services, etc. used for a remote control of a robot or machinery, industrial automation, an unmanned aerial vehicle, remote health care, an emergency alert, and the like may be considered. Therefore, communication provided by the URLLC should also provide very low latency and very high reliability. For example, a service that supports the URLLC should satisfy an air interface latency less than 0.5 milliseconds and has requirements of a packet error rate of 10-5 or less at the same time. Therefore, for the service that supports the URLLC, the 5G system may be required to provide a transmit time interval (TTI) smaller than other services, and at the same time, design matters for allocating a wide resource in a frequency band may be required to secure the reliability of the communication link.

Three services of 5G, which are the eMBB, the URLLC, and the mMTC, may be multiplexed and transmitted in one system. Different transmission or reception techniques and transmission or reception parameters may be used between services in order to satisfy different requirements of respective services. 5G is not limited to the three services described above.

For convenience of description below, some terms and names defined in the 3GPP standard (standards of 5G, NR, LTE, or similar systems) may be used. However, the disclosure is not limited by the terms and names, and may be equally applied to systems conforming to other standards. Terms used for identifying an access node, terms indicating network entities, terms indicating messages, terms indicating interfaces between network entities, terms indicating various identification information, etc. used in the following description are illustrated for convenience of description. Therefore, the disclosure is not limited to the terms used herein, and other terms referring to objects having equivalent technical meanings may be used.

FIG. 1 shows a high level representation of the architecture of O-RAN. FIG. 1 shows a Service and Orchestration framework 101, which includes a Non-Real-time RAN Intelligent Controller, RIC, 102. This is connected via the A1 interface to a Near-Real-tile RIC 103 which is then further connected to one or more E2 nodes, 104, via the E2 interface. The E2 node(s) 104 may be directly connected to the Service and Orchestration Framework 101 via the O1 interface.

In a nutshell, an open radio access network (O-RAN) defines radio units (RU), digital units (DU), control units (CU)-control plane (CP), and user planes (UP) as O (O-RAN)-RU, O-DU, O-CU-CP, O-CU-UP.

The Non-RT RIC 102 is a logical function that enables non-real-time control and optimization of RAN elements and resources, Artificial Intelligence/Machine Learning (AI/ML) workflow including model training and updates, and policy-based guidance of applications/features in the near-RT RIC 103. The near-RT RIC 103 is a logical function that enables near-real-time control and optimization of RAN elements and resources via fine-grained data collection and actions over the E2 interface. The E2 Node 104 is a logical node terminating the E2 interface. O-RAN nodes terminating the E2 interface may be O-CU-CP, O-CU-UP, O-DU or any combination for NR access or O-eNB for E-UTRA access. O-RAN Central Unit (O-CU) is a logical node hosting the O-CU-CP and the O-CU-UP. The O-RAN Central Unit-Control Plane (O-CU-CP) is a logical node hosting Radio Resource Control (RRC) and the control plane part of Packet Data Convergence Protocol (PDCP). The O-RAN Central Unit-User Plane (O-CU-UP) is a logical node hosting the user plane part of the PDCP and Service data association protocol (SDAP). The O-RAN Distributed Unit (O-DU) is a logical node hosting Radio Link Control (RLC)/Medium Access Control (MAC)/High-PHY layers based on a lower layer functional split. The O-RAN Radio Unit (O-RU) is a logical node hosting Low-PHY layer and radio frequency (RF) processing based on a lower layer functional split. This is similar to 3GPP's "Transmission/Reception Point (TRP)" or "remote radio head (RRH)" but more specific in including the Low-PHY layer. The A1 interface is an Interface between non-RT RIC 102 and Near-RT RIC 103 to enable policy-driven guidance of Near-RT RIC applications/functions, and support A1/ML workflow. The E2 interface is an interface connecting the Near-RT RIC 103 and one or more O-CU-CPs, one or more O-CU-UPs, and one or more O-DUs.

RIC is a logical node that can collect information on cell sites transmitted and received by a UE, O-eNB, O-DU, O-CU-CP, or O-CU-UP. The RIC can be implemented in the form of a server concentrated in one physical place or it can be implemented as a logical function within the base station, gNB. In the following, the nodes that are connected to RIC through the E2 interface, are referred to as E2 nodes. It is to be understood that embodiments of this disclosure are generally applied to E2 nodes, and it is one aim of embodiments of the disclosure to present new parameters and procedures over the E2 interface, regardless of what the individual E2 nodes are. Here, E2 nodes may be understood as objects constituting a RAN that can operate according to the O-RAN standard, and may be referred to as an E2 node. An E2 node may also refer to an O-eNB.

Applications, known as xApps, can be developed in Near-RT RIC and provide control to the RAN functions in the E2 nodes. Such examples can be found in the "O-RAN Architecture Description v4.0". Applications, known as rApps, can developed in Non-RT RIC as a platform application that provide analytics related function and RAN governing policy function.

The interface with the RANs that can operate according to the O-RAN standard between RIC and E2 nodes uses an application protocol known as E2AP. As defined by O-RAN Working Group 3, WG3, a given RAN Function offers a set of services to be exposed over the E2 interface using E2AP defined procedures. In one E2 Service Model (SM), E2SM Radio control, E2SM-RC, the E2 Node terminating the E2 Interface is assumed to host one or more instances of the RAN Function "RAN Control" which performs the following functions:

E2 REPORT services used to expose RAN control and UE context related information E2 INSERT services used to suspend RAN control related call processes E2 CONTROL services used to resume or initiate RAN control related call processes, modify RAN configuration and/or E2 service-related UE context information E2 POLICY services used to modify the behaviour of RAN control related processes An embodiment of the disclosure relates to energy saving in a RAN.

Figure 2:
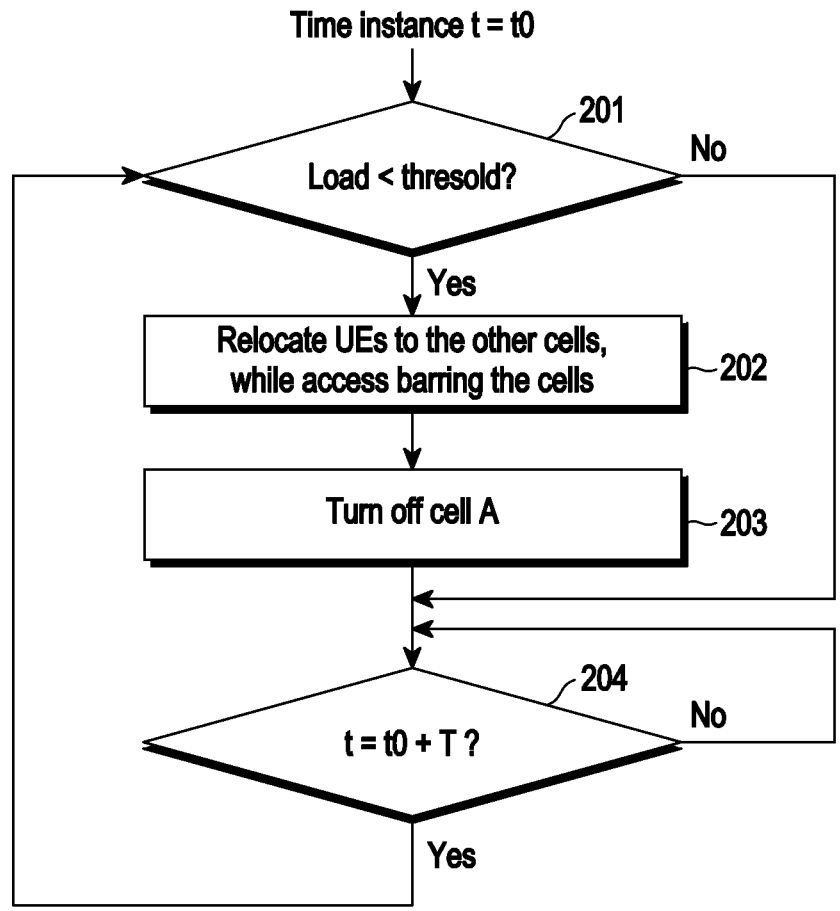
FIG. 2 shows a flowchart depicting an energy saving procedure as known in the prior art.

FIG. 2 shows a prior art example of an existing energy saving scheme in O-RAN with static cell on/off threshold. FIG. 2 shows an example of a static threshold, usually set by operator. The FIG. 2 shows an energy saving procedure performed at the E2 node(s), assuming a cell on/off action is performed at a time interval, T, where T is e.g. 1 hour, although this can be varied as required.

At step 201, a determination is made if the load on the cell A is lower than a predefined threshold (e.g. 10%). If so, at step 202, UEs are reallocated to other cells and further access is barred to the cell in question. At step 203, the cell (cell A) is turned off. At step 204, controls the repeat cycle with a periodicity of T.

The disclosure relates to apparatus and procedures between RIC and E2 nodes, to achieve dynamic cell activation/deactivation, according to the traffic, for the purpose of energy saving. The skilled person will realise that the specific examples presented herein are exemplary and are not intended to be limiting.

Two major embodiments are described herein, each corresponding to, and resulting in, different parameters, interfaces, and procedures.

In a first embodiment, AI is used to dynamically control cell activation and deactivation, according to the cell load and cell performance, for the purpose of energy saving.

In a second embodiment, AI is used to dynamically control the policy related to the energy saving that includes cell activation and deactivation targeting thresholds.

In the following, new parameters, interfaces, and procedures are described for each embodiment, respectively.

Dealing with the first embodiment, the following are provided and relate to important features of the embodiment.

1. A new enabler within near-RT RIC for RAN energy saving by dynamically turning cells on/off. This include a new xApp, namely the energy saving xApp, at near-RT RIC;

2. A new RAN control E2 Service Model CONTROL service style between near-RT RIC and the RAN control RAN function at the E2 node(s), where the new control service allows the configuration of cell activation and cell deactivation according to the actions from the xApp claimed in 1.

3. New E2 interface(s) between near-RT RIC and the E2 node(s), where the New E2 interface(s) are: 1) a list of the IDs of the cells to be activated; 2) a list of the IDs of the cells to be deactivated;

4. Reporting of the Key Performance Indicators, KPIs, from E2 node(s) to near-RT RIC (e.g., cell throughput, instantaneous energy consumption, number of handovers) through E2 interface.

5. Reporting of cell activation and deactivation status from E2 node(s) to near-RT RIC, through E2 interfaces.

6. A procedure related to enabling the energy saving xApp and its control of cell activation/deactivation dynamically.

Figure 3:
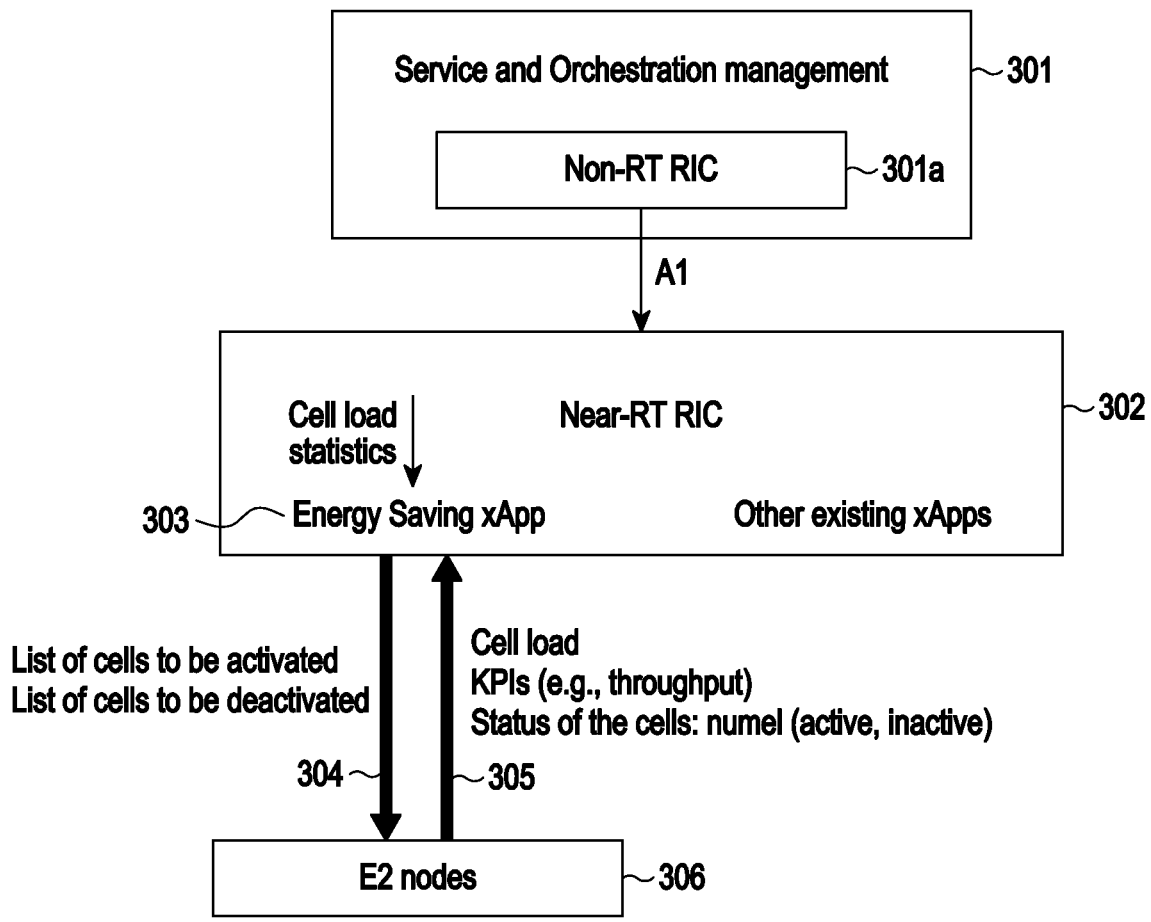
FIG. 3 shows a high level architecture for energy saving O-RAN using an xApp according to an embodiment of the disclosure.

FIG. 3 shows a high level architecture for energy saving O-RAN using an xApp according to an embodiment of the disclosure. FIG. 3 refers to the high level architecture of the first embodiment. For a general description of each entity in FIG. 3, the above description of FIG. 1 may be referenced.

As illustrated in FIG. 3, the non-RT RIC 301a in service orchestration and management 301 enables non-real-time control and optimization of RAN elements and resources and policy-based guidance to the applications/features in Near-RT RIC 302 through the A1 interface.

In an embodiment, a new xApp is provided, i.e. the energy saving xApp 303 in Near-RT RIC 302. The xApp 303 uses cell statistics collected from non-RT RIC 301a, such as load statistics, and calculates the energy consumption of the E2 node(s) it connects to. It then makes a decision, according to the parameters obtained from E2 interface, e.g., instantaneous cell load and KPIs of the E2 node(s) and decides a list of cells to be activated and deactivated. The deactivation of the cells may occur, e.g., when cell load is low and the energy saving xApp 303 may decide to deactivate some cells and handover the UEs of these cells to the other cells, for energy saving purposes. The activation of the cells may occur, in circumstance when, e.g. 1) KPI degradations may occur, e.g., throughput drop, or 2) there is a (predicted) traffic increase, then the energy saving xApp shall activate a list of cells.

The decision made by xApp 303 may lead to an update of the list of the cells to be activated and/or deactivated. These parameters 304 shall be passed from near-RT RIC 302 to the E2 node(s) 306, and E2 node(s) 306 shall be activated and/or deactivated accordingly. The E2 node(s) 306 shall send their performance monitoring (e.g., throughput) to near-RT RIC 302, for xApp 303 to update its decisions accordingly. The E2 node(s) 306 shall also report status of cell activation and deactivation to near-RT RIC 302, such that the reported information can be used for other xApps, e.g., handover control. The parameters passed through E2 interface, from E2 nodes to near-RT RIC, are noted as 305 in FIG. 3.

Figure 4:
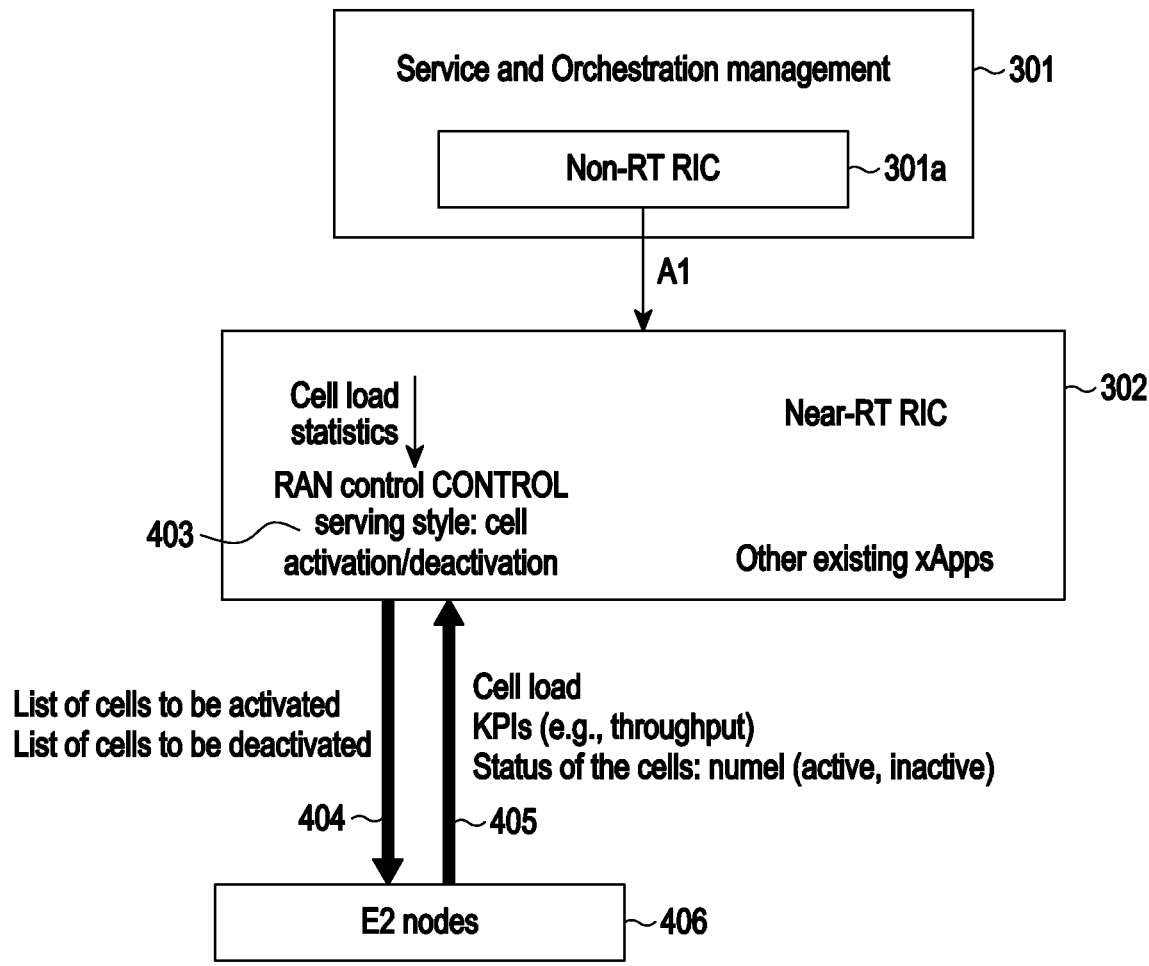
FIG. 4 shows a high level architecture for energy saving using RAN control CONTROL service style according to an embodiment of the disclosure.

FIG. 4 shows a high level architecture for energy saving using RAN control CONTROL service style according to an embodiment of the disclosure. Embodiment of FIG. 4 showing another embodiment of the FIG. 3, energy saving at the RAN is achieved by adding a new RAN control CONTROL service style 403: cell activation/deactivation. As illustrated in FIG. 4, the new service style is applied to modify the configuration and control cell activation/deactivation due to energy saving. Similarly numbered elements 403, 404, 405 and 406 are similar to those 303, 304, 305 and 306 shown in FIG. 3 and so descriptions thereof are omitted for brevity.

services on Cell Activation Control, which is used for modification of the configuration and to control cell activation/deactivation due to energy saving.

TABLE 1

| RIC Style Type | Style Name | Style Description |
|---|---|---|
| 1 | Radio Bearer control | Used to modify the configuration the Radio Bearer Control (RBC) related parameters and/or behaviours at the E2 Node for a specific UE |
| 2 | Radio resource allocation control | Used to modify the configuration the Radio Resource Allocation control related parameters and/or behaviours at the E2 Node for a specific E2 Node, cell, slice, UE and/or QoS |
| 3 | Connected mode mobility control | Used to initiate a connected mode mobility procedure (Handover or Conditional Handover), optionally with Dual Active Protocol Stack (DAPS), for a specific UE towards either a target cell (for HO) or a list of candidate cells (for CHO) |
| 4 | Radio access control | Used to modify Radio access related functions used to control UE access to cells |
| 5 | Dual connectivity (DC) control | Used to initiate Dual connectivity (DC) mechanisms |
| 6 | Carrier Aggregation (CA) control | Used to initiate Carrier Aggregation (CA) mechanisms |
| 7 | Idle mode mobility control | Used to modify Idle mode mobility related functions used to control UE reselection of cells |
| 8 | UE to RAN UE group assignment | Used to support POLICY services |
| 9 | Cell activation | Used to modify the configuration and control cell activation/deactivation due to energy saving |

Figure 5:
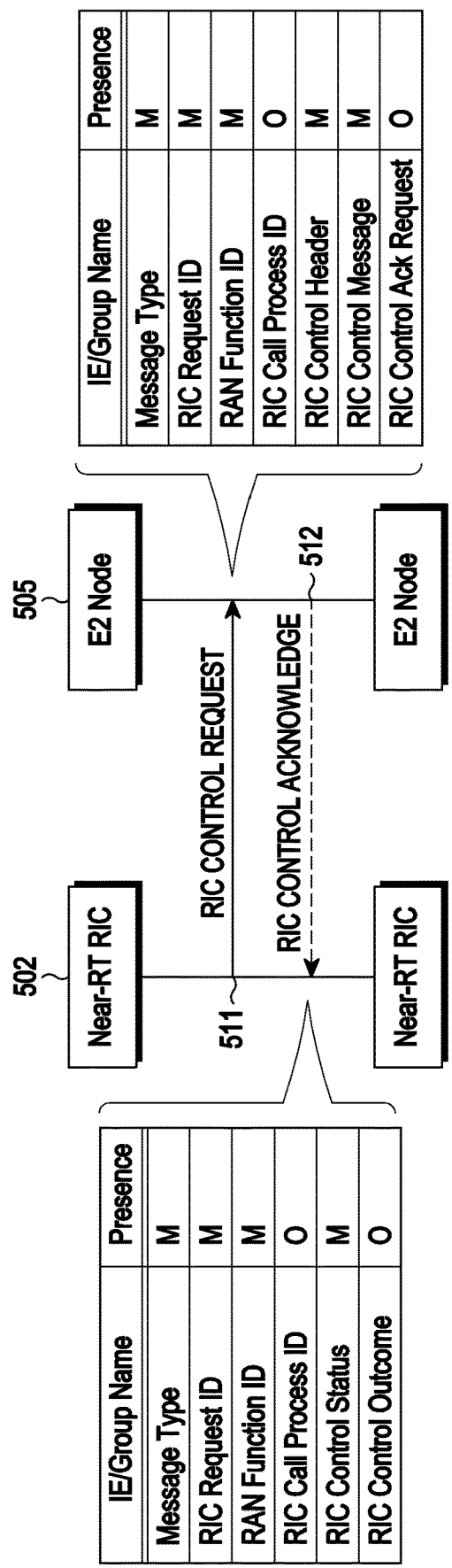
FIG. 5 shows E2 control message flows and Message Information Elements according to an embodiment of the disclosure.

FIG. 5 shows E2 control message flows and Message Information Elements according to an embodiment of the disclosure.

Referring to FIG. 5, Near-RT RIC 502 is able to control E2 Node 505 through E2 Application Protocol message, E2AP RIC Control Request Message. The message flows and Message Information Elements are shown in FIG. 5. The Near-RT RIC 502 may be Near-RT RIC 302 of FIGS. 3, 4, and E2 Node 505 may be E2 Node 306, 406 of FIGS. 3, 4. FIG. 5 shows RIC CONTROL REQUEST sent from Near-RT RIC 102 to E2 Node 106 (step 511) and the RIC CONTROL ACKNOWLEDGE sent in the opposite direction (step 512). The various Information Elements, IE, included or possible in each message of steps 511, 512 are also shown in FIG. 5.

FIG. 6 shows RIC Control Request Message format according to an embodiment of the disclosure.

In FIG. 6, the RIC Control Request Message format is introduced in FIG. 5. The message format comprises at least one of a message type, RIC Request ID, RIC Call Process ID, and a RIC Control Header. The RIC Control header IE 601 indicate the choices of E2SM-RC (E2 service model for RAN "Control") Control Message Header Format 1 or E2SM-RC Control Message Header Format 2. E2SM-RC Control Message Header Format 1 is that for the all CONTROL REQUEST messages carry the UEID in the Control Header, while E2SM-RC Control Message Header Format 2 is that for the all CONTROL REQUEST message for Cell basis or Slice basis RAN resource control.

Specifically, a new style, namely 'cell activation', is added as a new RIC style—type 9—in the following table, Table 1 which represents a CONTROL Service style list. It indicates that, based on O-RAN standard, the "RAN Control" RAN Function provides support of the CONTROL The CONTROL service style therefore further contains a CONTROL Service RIC Control Message IE, where the contents of the RIC Control Message is the list of cells to be activated and/or deactivated.

The following Table 2, below, shows RAN Parameter IDs and how these are used to control which cells are to be activated and/or deactivated accordingly.

TABLE 2

| RAN Parameter ID | RAN Parameter Name | RAN Parameter Type | Parameter description |
|---|---|---|---|
| 1 | Activated cell list | List of cell ID | List of cell ID to be added to list of cells to be activated |
| 2 | Deactivated cell list | List of cell ID | List of cell ID to be added to the list of cells to be deactivated |

A person skilled in the art would appreciate the E2 nodes described above, could include but not be limited to, eNB, O-CU and O-DU. How the cells are configured within the E2 nodes according to the actions output from energy saving in near-RT RIC is irrelevant to embodiments of the present disclosure. As an example, the cell activation/deactivation configuration can be passed from O-CU to O-RU, to activate and deactivate RU. A person skilled in the art would also appreciate that the method can be straightforwardly extended to energy saving in DU. For example, the on/off configuration could be passed from O-CU to O-DU, to instruct servers in the O-DU to be turned on or off, for energy saving purposes.

The new CONTROL service style set out above further contains IEs exchanged between Near-RT RIC 302 and E2 nodes 306, 406. The following Table 3 below describes the message of the new E2SM-RC Control CONTROL service Style and the related IEs. These IEs, specified in Section 8.3 of O-RAN.WG3.E2SM-RC-v01.00.03, is detailed as follows.

TABLE 3

| IE/Group Name | Presence | Range | IE type and reference | Semantics description |
|---|---|---|---|---|
| CHOICE Cell Identifier | M | | | |
| >NR | | | | |
| >>NR Cell Identity | M | | BIT STRING (SIZE(36)) | The leftmost bits of the NR Cell Identity IE correspond to the gNB ID |
| >E-UTRA | | | | |
| >>E-UTRA Cell Identity | M | | BIT STRING (SIZE(28)) | The leftmost bits of the E-UTRA Cell Identity IE correspond to the ng-eNB ID |

In another IE, a message is sent by the near-RT RIC 302 to E2 nodes 306, 406 to request the deactivation of one or multiple cells.

TABLE 4a

| IE/Group Name | Presence | Range | IE type and reference |
|---|---|---|---|
| Message Type | M | | 38.423 9.2.3.1 |
| CHOICE Served Cells To Activate | M | | |
| >NR Cells | | | |
| >>NR Cells List | | 1 | |
| >>>NR Cells item | | 1 ... <maxnoofCellsinNG-RANnode> | |
| >>>>NR CGI | M | | 38.423 9.2.2.7 |
| >E-UTRA Cells | | | |
| >>E-UTRA Cells List | | 1 | |
| >>>E-UTRA Cells item | | 1 ... <maxnoofCellsinNG-RANnode> | |
| >>>>E-UTRA CGI | M | | 38.423 9.2.2.8 |

| Range bound | Explanation |
|---|---|
| maxnoofCellsinNG-RANnode | Maximum no. cells that can be served by an NG-RAN node. Value is 16384. |

In yet another IE, a message is sent by the near-RT RIC 102 to E2 nodes 106 to request activation of one or multiple cells. This is described below in the following Table 4b.

TABLE 4b

| IE/Group Name | Presence | Range | IE type and reference |
|---|---|---|---|
| Message Type | M | | 38.423 9.2.3.1 |
| CHOICE Served Cells To Deactivate | M | | |
| >NR Cells | | | |
| >>NR Cells List | | 1 | |
| >>>NR Cells item | | 1 ... <maxnoofCellsinNG-RANnode> | |
| >>>>NR CGI | M | | 38.423 9.2.2.7 |
| >E-UTRA Cells | | | |
| >>E-UTRA Cells List | | 1 | |
| >>>E-UTRA Cells item | | 1 ... <maxnoofCellsinNG-RANnode> | |
| >>>>E-UTRA CGI | M | | 38.423 9.2.2.8 |
| Activation ID | M | | INTEGER (0 ... 255) |

In yet another IE, a message is sent from E2 nodes 306, 406 to near-RT RIC 302 to report the list of one or multiple deactivated cells. This is described in the following Table 5a below.

TABLE 5a

| IE/Group Name | Presence | Range | IE type and reference |
|---|---|---|---|
| Message Type | M | | 38.423 9.2.3.1 |
| Activated cells >NR Cells | M | | |
| >>NR Cells List | | 1 | |
| >>>NR Cells item | | 1 . . . <maxnoofCellsinNG-RANnode> | |
| >>>>NR CGI | M | | 38.423 9.2.2.7 |
| >E-UTRA Cells | | | |
| >>E-UTRA Cells List | | 1 | |
| >>>E-UTRA Cells item | | 1 . . . <maxnoofCellsinNG-RANnode> | |
| >>>>E-UTRA CGI | M | | 38.423 9.2.2.8 |

In yet another IE, a message is sent from E2 nodes 306, 406 to near-RT RIC 302 to report the list of one or multiple activated cells. This is described in Table 5b below.

TABLE 5b

| IE/Group Name | Presence | Range | IE type and reference |
|---|---|---|---|
| Message Type | M | | 38.423 9.2.3.1 |
| Deactivated cells >NR Cells | M | | |
| >>NR Cells List | | 1 | |
| >>>NR Cells item | | 1 . . . <maxnoofCellsinNG-RANnode> | |
| >>>>NR CGI | M | | 38.423 9.2.2.7 |
| >E-UTRA Cells | | | |
| >>E-UTRA Cells List | | 1 | |
| >>>E-UTRA Cells item | | 1 . . . <maxnoofCellsinNG-RANnode> | |
| >>>>E-UTRA CGI | M | | 38.423 9.2.28 |

Alternatively, in yet another IE, a message is sent from E2 nodes 106 to near-RT RIC 102 to report the status of the list of one or multiple cells, e.g. cell 0 is activated, cell 1 is deactivated, etc. The detail is described in the following Table 6, below.

TABLE 6

| RAN Parameter Name | RAN Parameter Type | Parameter description |
|---|---|---|
| Cell Activation status | BOOLEAN | TRUE = Activated; False = Deactivated |

Figure 7:
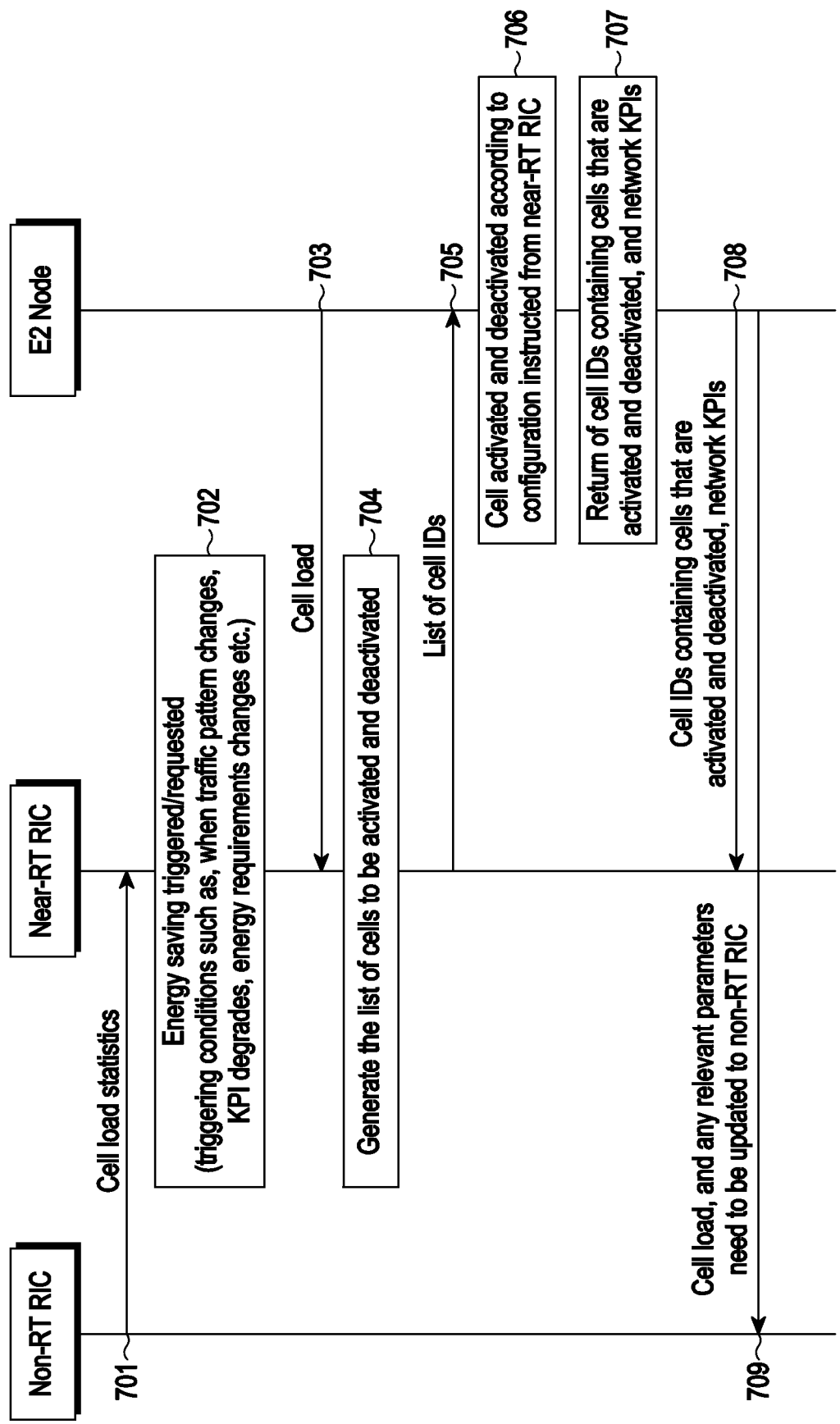
FIG. 7 shows a flowchart depicting message flow and procedure according to an embodiment of the disclosure.

FIG. 7 shows a flowchart depicting message flow and procedure according to an embodiment of the disclosure.

FIG. 7 shows a message flow showing the procedure of energy saving in O-RAN, where steps 702, 704, 706 and 707 are the corresponding actions taken at different components in O-RAN, and steps 701, 703, 705, 708 and 709 are the corresponding information/data/parameters that are passed/transmitted between different components, the flow of which are indicated by the direction of the arrows. The non-RT RIC, near-RT RIC, and E2 node(s) in the embodiment of FIG. 7 may be non-RT RIC, near-RT RIC, and E2 node(s) in one or more embodiments of the disclosure, respectively.

In particular, as an example of the procedures forming an embodiment of the disclosure, FIG. 7 shows the following procedures:

Step 701. The non-RT RIC within Service orchestration and management would calculate the cell load statistics and pass/transmit the information to near-RT RIC.

Step 702. The near-RT RIC executes the function, as set out above in relation to the first embodiment, or service, as set out above in relation to the second embodiment, for energy saving. It is noted that here the function can be performed continuously at system initiation, periodically, according to a pre-configured time interval, or triggered when certain condition is met.

Step 703. The Near-RT RIC would request cell load from E2 node(s), and the E2 node(s) would return such cell load information to the Near-RT RIC through E2 interface.

Step 704. The Near-RT RIC generates a list of cells IDs, indicating the cells to be activated and/or deactivated, respectively, as the output of the intelligent module within near-RT RIC.

Step 705. The Near-RT RIC exposes/transmits the list of cell IDs to the E2 node(s).

Step 706. The E2 nodes configure cells activated and/or deactivated according to configuration instructed from the Near-RT RIC. It is noted that some operations of cell activation/deactivation may lead to success or fail at the E2 node(s).

Step 707. The E2 node(s) return status of the cells (activated/deactivated) and the status may be in a format of a list of cell IDs, or a Boolean variable indicating if a particular cell is active or inactive, as in FIG. 2. The E2 node(s) may also return network KPIs after the configuration. It is noted that the KPIs and status of cells may not be exposed at the same time slot. It is also noted that the exposure of network KPIs may be requested by other modules/services in the system, e.g., by monitoring functions.

Step 708, 709. The E2 node(s) report/transmit relevant network parameters, such as updates of the cell loads, to the non-RT RIC and/or Near-RT RIC.

According to embodiments of the present disclosure, a method performed by a radio access network (RAN) controlled controller (RIC) comprises the steps of: transmitting a RIC control request message to an E2 node; and receiving a RIC control confirmation message from the E2 node, wherein the RIC control request message includes information on a specific to RAN function specific to a service model, and the RIC control confirmation message for the function. The RIC control result information includes control result information, and the RIC control result information may include an event occurrence reason for the RAN function specific to the service model in a specific protocol.

According to embodiments of the present disclosure, a method performed by an E2 node comprises the steps of: receiving a RIC control request message from a radio access network (RAN) control controller (RIC); and transmitting a RIC control confirmation message to the RIC. The RIC control request message includes information on a specific to RAN function specific to a service model, and the RIC control confirmation message includes information on the RIC control function. The RIC control result information includes control result information, and the RIC control result information may include an event occurrence reason for the RAN function specific to the service model in a specific protocol.

In one embodiment of the disclosure, the energy saving xApp/procedure can run continuously, or be triggered by the operator or non-RT RIC (e.g., when KPI is not met by performance monitoring procedure).

The second embodiment of the present disclosure relates to energy saving and concerns semi-dynamically configuring the cell activation and deactivation policy. The optimal energy saving configuration parameters can be calculated in the analytics rApp from the non-RT RIC 101, according to analytics of the cell load data through the extended period. The new thresholds parameters can then be configured through the O1 interface to eNB, or through open fronthaul to O-RU. The cells are then activated or deactivated, once the cell load is lower than the specified thresholds. The thresholds can be updated periodically.

This embodiment may involve at least one of the following features 1) to 6):

1) New enabler within Non-RT RIC for RAN energy saving by semi-dynamically turning cells on/off. This includes a new rApp, namely the energy saving rApp, at Non-RT RIC;

2) Energy Saving RAN function that control Cell Activation and DeActivation at the E2 nodes. The configuration of cell activation and cell deactivation can also be configured at the O-RU.

3) New O1 interfaces parameters between Non-RT RIC and the E2 nodes, where the interfaces are: (1) a list of the IDs of the cells to be activated; (2) a list of the IDs of the cells to be deactivated;

4) Reporting of the KPIs from E2 nodes to Non-RT RIC (e.g., cell throughput, instantaneous energy consumption, number of handovers) through O1 interface.

5) Reporting of cell activation and deactivation status from E2 nodes to Non-RT RIC, through O1 interfaces.

6) A procedure related to enabling the energy saving rApp and its control of cell activation/deactivation Semi-dynamically.

Figure 8:
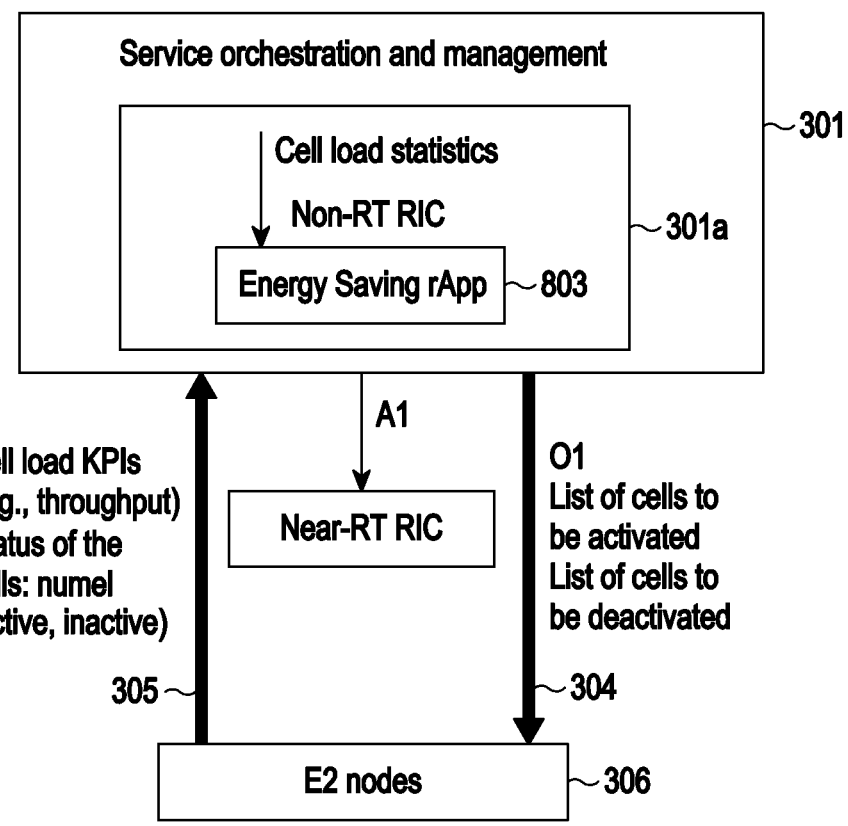
FIG. 8 shows a high level architecture for energy saving O-RAN using an rApp according to an embodiment of the disclosure.

FIG. 8 shows a high level architecture for energy saving O-RAN using an rApp according to an embodiment of the disclosure. For a general description of each entity in FIG. 8, the above description of FIG. 3 may be referenced.

As illustrated in FIG. 8, the non-RT RIC 301a in service orchestration and management 301 enables non-real-time control and optimization of RAN elements and resources to the applications/features in E2 Node(s) 306 based on the KPI report 304 and Cell Configuration 305 through O1 interface.

In one embodiment of the disclosure, it proposes to add a new rApp 803, i.e., the energy saving rApp 803 in Non-RT RIC 301a. The rApp 803 uses cell statistics collected from E2 Node(s) 306, such as load statistics, and calculates the energy consumption. It then makes a decision, according to the parameters obtained from O1 interface, e.g., instantaneous as well as average cell loads and KPIs of the E2 node(s), decides a list of cells to be activated and/or deactivated. The deactivation of the cells may occur, e.g., when cell load is low and the energy saving rApp 803 may decide to deactivate some cells and re-locate the UEs of these cells to the other cells, for energy saving purpose. The activation of the cells may occur, in circumstance when, e.g., 1) KPI degradations may occur, e.g., throughput drop, or 2) there is a (predicted) traffic increase and the energy saving rApp 803 shall activate a list of cells.

The decision made by rApp 803 may lead to update of the list of the cells to be activated and deactivated. These parameters 305 shall be passed from non-RT RIC 301a to the E2 node(s) 306, and E2 node(s) shall be activated and/or deactivated accordingly.

Figure 9:
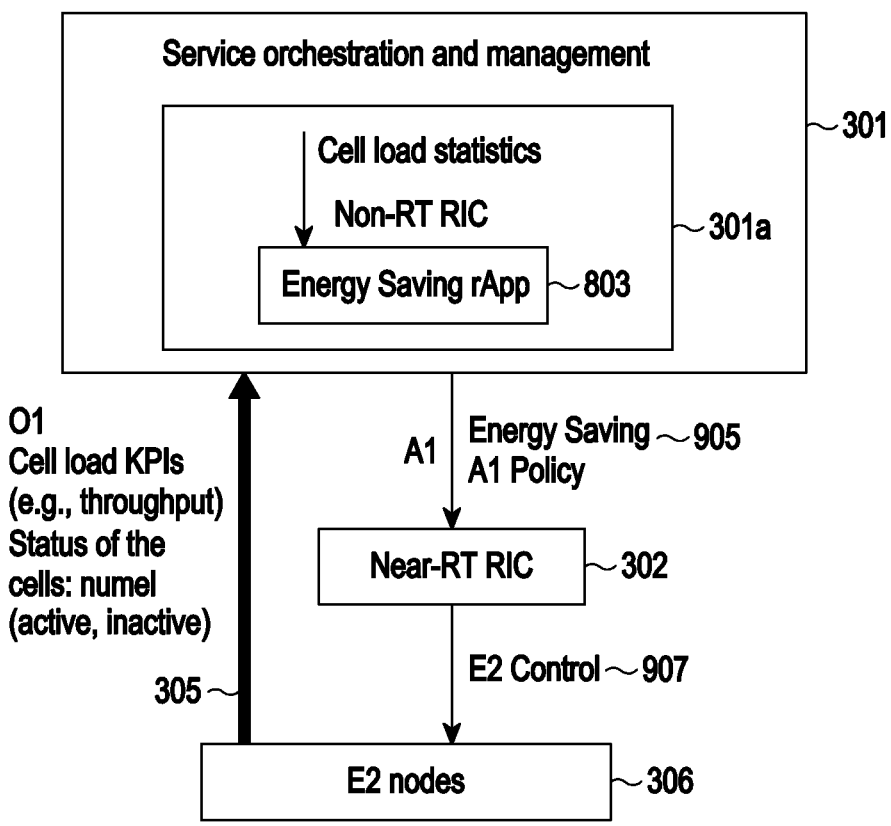
FIG. 9 shows a high level architecture for energy saving using an A1 policy according to an embodiment of the disclosure.

FIG. 9 shows a high level architecture for energy saving using an A1 policy according to an embodiment of the disclosure.

In another embodiment of the disclosure, energy saving at the RAN may be achieved by adding a new RAN control A1 Policy: cell activation/deactivation. As illustrated in FIG. 9, the new A1 Policy 905 may be applied to modify the configuration and control cell activation/deactivation due to energy saving. Near-RT RIC 302 is able to control E2 Node 306 through E2 control 907. For a general description of each entity in FIG. 9, the above description of FIG. 3 may be referenced.

Specifically, the Service Management and Orchestration (SMO) 301 (including non-RT RIC 301a) can perform one or more of the following:

Retrieve necessary performance, configuration, and load statistics of the cells, and other data for defining and updating policies to guide the behaviour of energy saving. For example, the policy could relate to specifying different optimization objectives (e.g., minimising energy consumption).

Training of potential Machine Learning, ML, models for energy optimization, which may respectively autonomously recognize traffic types, predict throughput and energy consumption under a certain traffic pattern.

Send policies/intents to near-RT RIC 302 to drive energy saving at RAN level in terms of expected behaviour.

Support communication of measurement configuration parameters to RAN nodes.

Support communication of enrichment information to Near-RT RIC 302, e.g., cell throughput, etc.

The apparatus (e.g. non-RT RIC, near-RT RIC or E2 node) according to the above-described embodiments may be implemented by including a transceiver and a processor for controlling an operation according to a combination of at least one embodiment as well as each of the embodiments.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

What is claimed is:

1. A method performed by a network entity in a wireless communication system using an open-radio access network (O-RAN), the network entity including a near-real-time radio access network (RAN) intelligent controller (near-RT RIC), the method comprising:
   receiving, from a service management and orchestration (SMO), policy information related to energy saving;
   receiving, from an E2 node, cell load information;
   determining, based on the cell load information, one or more cells to be turned off or on for the energy saving; and
   transmitting, to the E2 node, information about the one or more cells to be turned off or on for the energy saving, the E2 node corresponding to a RAN with the one or more cells.

2. The method of claim 1, wherein the network is arranged using the O-RAN.

3. The method of claim 1, further comprising:
   receiving, from the E2 node, information representing a result of one or more cells turned off or on.

4. The method of claim 1, wherein the information about the one or more cells represents status of the one or more cells set to be turned off or on for the energy saving.

5. The method of claim 1, where the near-RT RIC receives the policy information related to the energy saving from a non-real-time RAN intelligent controller (non-RT RIC) included in the SMO.

6. A network entity in a wireless communication system using an open-radio access network (O-RAN), the network entity including a near-real-time RAN intelligent controller (near-RT RIC), the network entity comprising:
   a transceiver; and
   a processor configured to:
      receive, via the transceiver from a service management and orchestration (SMO), policy information related to energy saving,
      receive, via the transceiver from an E2 node, cell load information,
      determine, based on the cell load information, one or more cells to be turned off or on for the energy saving, and
      transmit, to the E2 node via the transceiver, information about the one or more cells to be turned off or on for the energy saving, the E2 node corresponding to a RAN with the one or more cells.

7. The network entity of claim 6, wherein the processor is further configured to:
   receive, via the transceiver from the E2 node, information representing a result of one or more cells turned off or on.

8. The network entity of claim 6, wherein the information about the one or more cells represents status of the one or more cells set to be turned off or on for the energy saving.

9. The network entity of claim 6, where the processor is further configured to:
   receive, by the near-RT RIC, the policy information related to the energy saving from a non-real-time RAN intelligent controller (non-RT RIC) included in the SMO.

10. A method performed by an E2 node corresponding to a radio access network (RAN) with one or more cells in a wireless communication system using an open-radio access network (O-RAN), the method comprising:
- transmitting, to a near-real-time radio access network (RAN) intelligent controller (near-RT RIC), cell load information associated with energy saving;
- receiving, from the near-RT RIC, information about the one or more cells to be turned off or on for the energy saving; and
- performing cell turn off or on for the one or more cells based on the received information.

11. The method of claim 10, further comprising:
- transmitting, to the near-RT RIC, information representing a result of one or more cells turned off or on.

12. The method of claim 10, wherein the information about the one or more cells represents status of the one or more cells set to be turned off or on for the energy saving.

13. An E2 node corresponding to a radio access network (RAN) with one or more cells in a wireless communication system using an open-radio access network (O-RAN), the E2 node comprising:
- a transceiver; and
- a processor configured to:
  - transmit, to a near-real-time radio access network (RAN) intelligent controller (near-RT RIC) via the transceiver, cell load information associated with energy saving,
  - receive, via the transceiver from the near-RT RIC, information about the one or more cells to be turned off or on for the energy saving, and
  - perform cell turn off or on for the one or more cells based on the received information.

14. The E2 node of claim 13, wherein the processor is further configured to:
- transmit, to the near-RT RIC via the transceiver, information representing a result of one or more cells turned off or on.

15. The E2 node of claim 13, wherein the information about the one or more cells represents status of the one or more cells set to be turned off or on for the energy saving.

* * * * *